(12) United States Patent
LaRusso et al.

(10) Patent No.: US 12,497,514 B2
(45) Date of Patent: *Dec. 16, 2025

(54) COATING SYSTEM FOR ASPHALT AND RELATED METHODS

(71) Applicant: Asphalt Systems, Inc., Salt Lake City, UT (US)

(72) Inventors: Joseph LaRusso, Oro Valley, AZ (US); Bradley Richard Grose, Glade Park, CO (US)

(73) Assignee: ASPHALT SYSTEMS, INC., Salt Lake City, UT (US)

( * ) Notice: Subject to any disclaimer, the term of this patent is extended or adjusted under 35 U.S.C. 154(b) by 61 days.

This patent is subject to a terminal disclaimer.

(21) Appl. No.: 17/209,866

(22) Filed: Mar. 23, 2021

(65) Prior Publication Data

US 2021/0206977 A1    Jul. 8, 2021

Related U.S. Application Data

(62) Division of application No. 15/691,248, filed on Aug. 30, 2017, now Pat. No. 10,982,097.

(51) Int. Cl.
*C08L 95/00* (2006.01)
*E01C 9/00* (2006.01)
(Continued)

(52) U.S. Cl.
CPC .............. *C08L 95/005* (2013.01); *E01C 9/00* (2013.01); *E01C 11/005* (2013.01); *E01C 19/21* (2013.01);
(Continued)

(58) Field of Classification Search
CPC ............ C08L 95/005; C08K 5/20; E01C 7/18
See application file for complete search history.

(56) References Cited

U.S. PATENT DOCUMENTS

| 2,115,775 A | 5/1938 | Karr et al. |
| 3,162,101 A | 12/1964 | Rostler |

(Continued)

FOREIGN PATENT DOCUMENTS

| CN | 1856546 A | 11/2006 |
| CN | 102325842 A | 1/2012 |

(Continued)

OTHER PUBLICATIONS

R1, What are fine aggregates and how are they use, Sikes Concrete, 2023.*

(Continued)

*Primary Examiner* — Andrew J Bowman
(74) *Attorney, Agent, or Firm* — BakerHostetler (57) ABSTRACT

A coating system and related methods for an airfield surface or a roadway is described. The coating system may include a stable cationic emulsion for application to the airfield surface or the roadway. The stable cationic emulsion may include a) an asphalt blend comprising gilsonite, wherein the gilsonite is modified to possess a positive charge, b) one or more polymers, and c) one or more surfactants not including a cationic surfactant. The coating system may also include a fine aggregate material for application to the stable cationic emulsion applied to the airfield surface or the roadway.

15 Claims, 5 Drawing Sheets

(51) Int. Cl.
E01C 11/00 (2006.01)
E01C 19/21 (2006.01)
E01C 23/06 (2006.01)
(52) U.S. Cl.
CPC .......... E01C 23/06 (2013.01); C08L 2555/52 (2013.01); C08L 2555/70 (2013.01); C08L 2555/80 (2013.01); C08L 2555/84 (2013.01)

(56) References Cited

U.S. PATENT DOCUMENTS

| | | | |
|---|---|---|---|
| 3,220,953 | A | 11/1965 | Borgfeldt |
| 3,276,887 | A | 10/1966 | Pitchford |
| 3,445,258 | A * | 5/1969 | Boynton ................. C08K 5/20 106/277 |
| 3,577,250 | A | 5/1971 | Rostler |
| 4,073,659 | A | 2/1978 | Burris |
| 4,094,696 | A | 6/1978 | Burris |
| 4,193,816 | A | 3/1980 | Ferm et al. |
| 4,211,575 | A | 7/1980 | Burris |
| 4,282,037 | A | 8/1981 | Burris |
| 4,298,397 | A | 11/1981 | Burris |
| 4,399,243 | A | 8/1983 | Dixit et al. |
| 4,478,642 | A | 10/1984 | Schilling et al. |
| 4,492,781 | A | 1/1985 | Duszak et al. |
| 4,621,108 | A * | 11/1986 | Burris ................... C08L 95/005 523/307 |
| 4,772,648 | A | 9/1988 | Demangeon et al. |
| 5,006,012 | A | 4/1991 | Sterner |
| 5,153,026 | A * | 10/1992 | Reed ........................ E01C 7/18 516/41 |
| 5,224,990 | A | 7/1993 | Vicenzi et al. |
| 5,539,029 | A | 7/1996 | Burris |
| 5,811,477 | A | 9/1998 | Burris et al. |
| 5,925,695 | A | 7/1999 | Ohtsuka et al. |
| 6,325,833 | B1 | 12/2001 | Berlowitz et al. |
| 6,706,787 | B1 | 3/2004 | Burris et al. |
| 6,776,833 | B2 | 8/2004 | Yap et al. |
| 6,972,047 | B2 | 12/2005 | Butler et al. |
| 7,084,195 | B2 | 8/2006 | Suzuki |
| 7,264,667 | B2 | 9/2007 | Bouldin |
| 8,580,874 | B2 | 11/2013 | Wissel et al. |
| 8,821,064 | B1 | 9/2014 | Morris |
| 8,895,645 | B2 | 11/2014 | Rademacher et al. |
| 8,940,360 | B1 | 1/2015 | Brasier et al. |
| 2002/0058734 | A1 | 5/2002 | Harlan |
| 2010/0275817 | A1 | 11/2010 | Williams et al. |
| 2013/0195551 | A1 | 8/2013 | McDade et al. |
| 2014/0076199 | A1 | 3/2014 | Payne |
| 2014/0230693 | A1 | 8/2014 | Gonzalez et al. |
| 2015/0376410 | A1 | 12/2015 | Issariyakul |
| 2017/0144932 | A1 | 5/2017 | Lesueur |
| 2018/0171146 | A1 | 6/2018 | Allen et al. |
| 2018/0171147 | A1 | 6/2018 | Allen et al. |

FOREIGN PATENT DOCUMENTS

| | | |
|---|---|---|
| CN | 102492365 A | 6/2012 |
| CN | 104292860 A | 1/2015 |
| GB | 2089289 A | 6/1982 |
| JP | S57-142395 A | 9/1982 |
| JP | H11-209909 A | 8/1999 |
| JP | 2000-170116 A | 6/2000 |
| JP | 2000-336602 A | 12/2000 |
| JP | 2003-292785 A | 10/2003 |
| KR | 20090029161 A | 3/2009 |
| WO | 9423129 A1 | 10/1994 |
| WO | 2006003466 A2 | 1/2006 |

OTHER PUBLICATIONS

Gelardi et al., Chemistry of Chemical Admixtures, 2016, Science and Technology of Concrete Admixtures, pp. 1 and 2 (Year: 2016) [Cited in related U.S. Appl. No. 15/691,248].

LaRusso, Joe; "Life Extension of Airport Asphalt Pavement—Preventative Maintenance P-608"; AAC Airport Consultants Council; Lunch Learn; Jun. 2015; 87 pages [Cited in related U.S. Appl. No. 15/691,248].
"Emulsified Asphalt Seal Coats (with) (without) Aggregate"; Unified Facilities Guide Specifications; Apr. 2013; 21 pages [Cited in related U.S. Appl. No. 15/691,248].
Unique's Supplemental Claim Charts Identifying the Location of Claimed Limitations in the Prior Art; dated Sep. 15, 2023; 62 pages.
United States District Court of Northern District of Ohio Easter Division; Case No. 1:22-CV-00355; *Asphalt Systems, Inc.* vs *Unique Paving Materials Corporation et al.*; dated Sep. 15, 2023; 54 pages.
Djakfar et al.; "Performance of Recycled Porous Hot Mix Asphalt with Gilsonite Additive"; Advances in Civil Engineering; vol. 2015; Article ID 316719; Oct. 2015; 7 pages.
Widyatmoko et al.; "Assessment of the Effectiveness of Asphalt Pavement Preservative Materials"; 5$^{th}$ Eurasphalt & Eurobitume Congress; Jun. 2012; 14 pages.
Kok et al.; "Evaluation of high temperature performance of SBS + Gilsonite modified binder"; Fuel; vol. 90; Jun. 2011; p. 3093-3099.
Yilmaz et al.; "Effects of using asphaltite as filler on mechanical properties of hot mix asphalt"; Construction and Building Materials; vol. 25; May 2011; p. 4279-4286.
"GSB-88 Emulsified Sealer/Binder"; Technical Instructions & Specifications; Asphalt Systems Inc.; Mar. 1999; 4 pages.
"Standard Specifications for Road and Bridge Construction"; Colorado Dept. of Transportation; 2011; 788 pages.
"GSB-287"; https://web.archive.org/web/20111031090129/http://www.asphaltsysystemsinc.com/gsb-287; Asphalt Systems Inc.; © 2010; accessed Aug. 15, 2023; 2 pages.
Shoenberger et al.; "Evaluation of Runway Preservation System"; Geotechnical and Structures Laboratory; ERDC/GSL SR-03-2; US Army Corps of Engineers; Mar. 2003; 29 pages.
F. Worthington; "Gilsonite emulsion: sunscreen for our pavements"; https://trid.trb.org/view/1357931; National Academies of Sciences; © 2023; accessed Oct. 30, 2023; 2 pages.
Scientific Study Proves Benefits of GILSONITE® Uintaite in Asphalt Pavement; https://www.americangilsonite.com/news/scientific-study-proves-benefits-of-gilsonite-in-asphalt-pavement/; American Gilsonite Company; Nov. 2015; accessed Oct. 26, 2023; 2 pages.
Wilson et al.; "Alternative aggregates and materials for high friction surface treatments"; Final Report Project BDR74-977-05; Texas A&M Transportation Institute; May 2016; 159 pages.
Gilsonite Modified Asphalt Emulsion Seal Coats—Unified Facilities Guide Specifications; Section 31 01 13.63; Aug. 2016; 21 pages.
Integra-Seal® Asphalt Sealer.
KOLD-FLO® Crack Filler.
Ravel Seal® Pavement Preservation Emulsion.
Bituminous GSB-78® Sealer Binder.
*Asphalt Systems Inc.* vs *Unique Paving Materials Corp. and Robert C. Young*; U.S. District Court for the Northern District of Ohio Eastern Division; 1.22-CV-00355-CEF; First Amended Complaint; Apr. 19, 2023; 69 pages.
The Asphalt Handbook; Manual Series No. 4 (MS-4); 1989 Edition; Asphalt Institute; 629 pages.
GSB-Friction Seal® Trademark Application; 2018; 37 pages.
"ASI product listing"; https://www.asphaltsystemsinc.com/roads/; 2023; accessed Aug. 16, 2023; 5 pages.
GSB-88®—Tech Sheet; https://web.archive.org/web/20150510164324/http://www.asphaltsystemsinc.com:80/products/gsb-88; Asphalt Systems Inc.; 2015; 7 pages.
GSB-88®—New FAA P-608; https://web.archive.org/web/20160323 10013/http://www.asphaltsytemsinc.com/blog/item/p-608; Asphalt Systems Inc.; 2016; 4 pages.
Ravel Seal® Trademark Application; 2016; 11 pages.
KOLD-FLO® Pourable Asphalt Crack Filler for Pavement & Concrete Crack Repair; https://web.archive.org/web/20160311011400/http://uniquepavingmaterials.com:80/asphalt-repair/kold-flo-crack-filler/; Unique Paving Materials Corporation; 2016; 3 pages.
Integra-Seal® Eco-Friendly Asphalt Sealer by Unique; https://web.archive.org/web/20160329212938/http://uniquepavingmaterials.com:80/asphalt-repair/integra-seal-asphalt-sealed; Unique Paving Materials Corporation; 2016; 3 pages.

(56) References Cited

OTHER PUBLICATIONS

Integra-Seal® Eco-Friendly Asphalt Sealer by Unique; https://web.archive.org/web/20160520105007/http://uniquepavingmaterials.com/asphalt-repair/integra-seal-asphalt-sealer/; Unique Paving Materials Corporation; 2016; 3 pages.

* cited by examiner

COATING SYSTEM FOR ASPHALT AND RELATED METHODS

CROSS-REFERENCE TO RELATED APPLICATIONS

The present application is a divisional application of U.S. patent application Ser. No. 15/691,248 filed on Aug. 30, 2017, the entire disclosure of which is hereby incorporated by reference.

TECHNICAL FIELD

The present disclosure relates to a coating system and related for methods for asphalt pavements.

BACKGROUND

Asphalt pavement is a composite material that includes mineral aggregate and an asphalt binder which hardens to form a robust surface. Asphalt pavement deteriorates over time from oxidation of the asphalt binder, heavy loads, and varying climatic conditions. One method for restoring or repairing deteriorated asphalt pavement is to remove and replace the existing pavement with either newly prepared or recycled pavement. Removal and replacement, however, is expensive and wasteful. There exists, however, asphalt pavement maintenance products that are used to repair pavement surfaces.

A typical asphalt maintenance product includes a coating composition, such as a uintaite-asphalt composition, and an aggregate. In general, the composition may be spray applied to the asphalt pavement and the aggregate is then applied over the composition using spreaders or other similar devices. There are however many variations in how the composition and aggregate can be formulated. The components of the composition, type of aggregate, and the application rates (gals./yd$^2$ and/or lbs./yd$^2$) can all be varied to accomplish certain performance objectives. Furthermore, in some cases, the coating composition and aggregates may be combined together and then applied to the pavement. In large part, however, the specific product applied to the pavement and its application rate is dependent on how the pavement is used.

The asphalt pavement industry has two somewhat separate sectors: aviation/airfield and roadway. Aviation pavements have greater demands compared to roadway pavements. For aviation pavements, safety is paramount, construction operations and schedules are difficult to implement, and problems are more critical and more costly to address. Additionally, the airfield pavements are used to support airplanes whereas roadways are used for cars and trucks. The two pavements types also age differently. In general, the requirements for aviation pavements (e.g. performance requirements, specifications, quality control systems, etc.) are generally tighter and more extreme than those used for roadway pavements.

Common roadway asphalt maintenance surface treatments are not always suitable for airfield pavements. Common roadway treatments designed for durability beyond 3-5 years are typically not suitable for the required airfield pavements. As roadway treatments increase in age they also create safety-performance problems, e.g. creation and increase of foreign object debris (FOD) and decrease in positive friction characteristics. In situations where the airfield asphalt pavement, even if previously treated with a common uintaite-asphalt coating or another maintenance coating, begins to decay in terms of its surface-condition characteristics, then it must be treated again in order to maintain the minimum safety requirements. If no further treatment is applied, then the pavement must undergo a much more significant and expensive disruptive rehabilitation procedure. Common roadway treatments can be modified to improve roadway condition and increase the friction characteristics, thereby addressing the safety issues described above. Unfortunately, such treatments have a relatively brief lifespan, lasting 2-5 years or less. Other more substantial (heavily applied) asphalt maintenance treatments may provide a service-life of more than 3-5 years. However, those substantial treatments are less suitable for the requirements of airfield pavement applications. There is a lack of coating systems that can be applied at relatively heavier rates that are suitable in both roadway and aviation pavements, and have increased beneficial life.

SUMMARY

An embodiment of the present disclosure is a coating system for an airfield surface or a roadway. The coating system may include a stable cationic emulsion for application to the airfield surface or the roadway. The stable cationic emulsion may include a) an asphalt blend comprising gilsonite, wherein the gilsonite is modified to possess a positive charge, b) one or more polymers, and c) one or more surfactants not including a cationic surfactant. The coating system may also include a fine aggregate material for application to the stable cationic emulsion applied to the airfield surface or the roadway.

Another embodiment of the present disclosure is a method of manufacturing a stable cationic asphalt emulsion. The method includes blending an asphalt cement with gilsonite to form an asphalt blend. The method also includes preparing an aqueous solution comprising water, a modifier, and one or more surfactants, wherein none of the one or more surfactants is a cationic surfactant. The method further includes combining the asphalt blend with the aqueous solution to form a cationic emulsion, thereby giving rise to positive charge on a portion of the gilsonite so as to form the stable cationic emulsion. The method also includes adding one or more polymers to the aqueous solution or the cationic emulsion.

Another embodiment of the present disclosure is a method for applying a coating system to a surface. The method includes spraying with a applicator vehicle a stable cationic emulsion on to a surface. The stable cationic emulsion has a) an asphalt blend comprising gilsonite with the gilsonite modified to possess a positive charge, b) one or more polymers, and c) one or more surfactants not including a cationic surfactant. The method also includes applying a fine aggregate at a rate of at least 1.0 lbs per square yard onto the stable cationic emulsion applied to the surface.

Another embodiment of the present disclosure is a system for coating a surface. The system includes a spraying unit for spraying the stable cationic emulsion. The system also includes a spreader unit mounted to the applicator and configured to apply the fine aggregate to the surface. The spreader unit includes a hopper to hold the fine aggregate material, a controllable gate coupled to the hopper, the controllable gate being moveable to allow the fine-aggregate to exit the hopper, and a roller assembly near the controllable gate configured to apply the fine aggregate material onto the sprayed emulsion.

BRIEF DESCRIPTION OF THE DRAWINGS

The foregoing summary, as well as the following detailed description of illustrative embodiments of the present application, will be better understood when read in conjunction with the appended drawings. For purposes of illustrating the present application, there is shown in the drawings illustrative embodiments of the disclosure. It should be understood, however, that the application is not limited to the precise arrangements and instrumentalities shown. In the drawings.

DETAILED DESCRIPTION OF ILLUSTRATIVE EMBODIMENTS

Embodiments of the present disclosure include a coating system for application to an airfield surface or a roadway surface and methods of making components of such a coating system. Embodiments of the present disclosure also include systems and methods for applying the coating system to an airfield surface or a roadway surface. The inventive concepts herein include a coating system comprised of a stable cationic emulsion and a fine aggregate material for application to the stable cationic emulsion that is applied to the airfield surface or the roadway. The stable cationic emulsion may include an asphalt blend comprising gilsonite. In various embodiments, gilsonite includes components that are modified to possess a positive charge, thereby giving rise to a stable cationic emulsion. The coating system has been found to be suitable for both aviation and roadway pavements, despite the variance in end use requirements for each pavement type. Each component of the coating system will be described below.

The stable cationic emulsion may include an asphalt blend comprising gilsonite, one or more polymers, and one or more surfactants that do not include a cationic surfactant. The emulsion may also include a modifier, such as acid, and water. The cationic emulsion is processed so that the gilsonite in the asphalt blend has cationic properties. This, in turn, permits use of non-cationic type surfactants. The presence of polymer(s) in the emulsion, surfactants, and modifier create a stable emulsion that can be stored for extended periods of time for later use. This allows the emulsion to be pumped into storage tanks and/or delivered to work sites over extended distances without degrading the efficacy of the coating system when applied to the pavement surfaces.

The asphalt blends includes at least asphalt cement and gilsonite. In some cases, additional additives, such as oils and surfactants, may be added to the asphalt blend as processing aid or binders. Asphalt cement may be described as a colloid system comprised various components. For example, the asphalt cement may include, asphaltenes, aromatics, resins, and oily/waxy saturates, among other components. In most cases, the hard asphaltenes are surrounded (solvated) by the aromatics, resins, oily/waxy saturates, etc. The asphalt blend may have certain parameters that are preferable. In one example, the asphalt cement is 120/140 penetration grade asphalt. The penetration grade is an assessment of how hard it is to penetrate it with a particular. The penetration grade for asphalt cement as used herein is measured in accordance with test method ASTM D-5. The asphalt blend can also have a colloidal index at least 2.50 to ensure a good balance. Furthermore, the asphalt blend and the asphalt cement should have certain range of saturate, aromatic, resin and asphaltene (SARA) paramaters. See for instance, table 3 below. SARA analysis method that divides crude oil components according to their (chemical group classes, of interest herein is) polarizability and polarity. As used herein, the SARA analysis method used is ASTM D-2007.

Gilsonite is a naturally occurring asphaltite hydrocarbon mineral resin. Gilsonite is a unique composition that is known to be difficult to compound into an asphalt emulsions. Gilsonite is a combination of various molecules that act in asphalt compositions in a number of different ways. Gilsonite is known to be relatively high in polars and resins. For this reason, gilsonite can solvate asphaltenes typically present in asphalt cement. Gilsonite also generally establishes a more uniform spectrum to asphalt's colloid balance. Gilsonite is selected, in part, because its colloidal properties balance well with the colloidal properties of asphalt cement typically available.

The gilsonite in the asphalt blend has been modified (to) improve adhesion. Gilsonite has relatively high nitrogen content. The nitrogen in gilsonite is present as a pyrrole molecule (i.e. a polar resin) and the addition of gilsonite increases the polar (polar resin) fraction of the asphalt blend as seen in the SARA analysis. The nitrogen pyrrole in gilsonite has certain beneficial characteristics. Because gilsonite comprises nitrogen pyrroles, and pyrroles are non-toxic to living organisms, gilsonite is deemed environmentally beneficial. Furthermore, the presently disclosed inventive concepts capitalize on the presence of nitrogen pyrroles. In certain embodiments, the nitrogen pyrroles are modified to become a surfactant in the emulsion. By driving the pH of the emulsion down to an acidic state via presence of a modifier, such as an acid, the nitrogen pyrrole is activated to become a N+ positively charged molecule on the surface of the gilsonite-asphalt droplet. Thus, portions of the gilsonite possess a positive charge and behave as a cationic surfactant. The modified gilsonite in combination with use of non-cationic surfactants supplies the desired cationic characteristic of the emulsion. The surprising result is a uniquely stable emulsion. Furthermore, this aspect also creates a gilsonite-asphalt droplet with an inherent adhesion property. It is believed that the cationic charge of the gilsonite acts as an adherent, instead of relying on a surfactant for adhesion as is used on typical asphalt emulsions. Cationic adhesion is a necessary property for adhesion of the asphalt droplet to the negatively/anionic pavement surface. Table 1 below illustrate typical metals found in gilsonite in accordance with the present disclosure as measured with x-ray Fluorescence or XRF, which is used to grade the product's composition in regards to metals.

TABLE 1

Approximate Metal Content of Gilsonite

| Metal | Approx. Max. ppm |
|---|---|
| Na | 500 |
| Mg | 200 |
| Al | 550 |
| Si | 1600 |
| Ca | 350 |
| Cu | 1 |
| Fe | 450 |
| Mo | 11 |
| Zn | 15 |

The amount of asphalt blend in the emulsion can vary. In one example, the asphalt blend comprises between about 50.0% to about 70.0% by weight of the emulsion. In another example, the asphalt blend comprises between about 55.0% to about 65.0% by weight of the emulsion. The amount of asphalt cement in the asphalt blend is at least 85% by weight of the asphalt blend. In one example, asphalt cement is present in the asphalt blend at a level of at least 80% by weight of the asphalt blend. The gilsonite may comprise at least 15% by weight of the asphalt blend. In one example, gilsonite is present in the asphalt blend at a level of at least 20% by weight of the asphalt blend. Furthermore, it should be appreciated that at these stated levels, the gilsonite may comprise at least 10% by weight of the emulsion. In some cases, however, the asphalt blend and/or the amount gilsonite may comprise more or less than the ranges stated above.

The emulsion may comprise one or more polymers. Polymers may be used to increase the durability and toughness of the completed coating system and aid in retaining fine-aggregate material in the coating applied to the pavement. Exemplary polymers or copolymers include those that assist in providing desired properties for the asphalt emulsion residue, for example by, providing a stress-absorbing layer that strongly adheres to the underlying pavement, by providing a non-tacky surface, or by providing a polymer with a non-swelling nature. In one example, the polymers may include polymers and co-polymer combinations, such as acrylic, a styrene-butadiene rubber, or combinations thereof. The polymer or polymers may comprise between about 1.0% to about 5.0% by weight of the emulsion.

Exemplary acrylic polymers or copolymers are preferably derived from acrylate monomers. The acrylate monomers may for example be based on (meth)acrylic acid, esters of (meth)acrylic acid, (meth)acrylamide, (meth)acrylonitrile and derivatives of these acrylate monomers. Exemplary esters of (meth)acrylic acids include, but are not limited to, alkyl and hydroxyalkyl esters, e.g., methyl (meth)acrylates, ethyl (meth)acrylates, butyl (meth)acrylates, hydroxyethyl (meth)acrylate, isobornyl (meth)acrylate, and longer chain alkyl (meth)acrylates such as ethylhexyl (meth)acrylate, lauryl (meth)acrylate, cetyl (meth)acrylate, and stearyl (meth)acrylate. Derivatives of (meth)acrylamide include, but are not limited to, alkyl substituted (meth)acrylamides, e.g., N,N-dimethyl (meth)acrylamide, N,N-dipropyl (meth)acrylamide, t-butyl (meth)acrylamide, N-octyl (meth)acrylamide, and longer chain alkyl (meth)acrylamides such as N-lauryl (meth)acrylamide and N-stearyl (meth)acrylamide. The acrylic polymers also include polymers commonly known as acrylics, acrylate polymers, polyacrylates or acrylic elastomers. Acrylate polymers belong to a group of polymers which could be referred to generally as plastics while acrylic elastomer is a general term for a type of synthetic rubber whose main component is an acrylic acid alkyl ester (for example, an ethyl or butyl ester).

Exemplary copolymers include polymers derived from polyolefins, such as vinyl acetate, vinyl chloride, vinylidene chloride, styrene, substituted styrene, butadiene, unsaturated polyesters, ethylene and the like. In some embodiments, the acrylic copolymer is derived from acrylate monomers and mixtures thereof and polymerized with styrene or ethylene. In still other embodiments, the acrylic copolymer is derived from butyl acrylate and copolymerized with styrene or ethylene. In yet other embodiments, the copolymer is an acrylonitrile butadiene.

The emulsion includes one or more surfactants. The surfactants establish appropriate stability, viscosity, and other necessary properties of the emulsion in storage, transport, application, set and cure. The surfactants also facilitate short-term and long-term enhancements of the polymer binder to in the pavement.

The surfactants may be a non-ionic surfactant and an amphoteric surfactant. In most instances, however, the emulsion does not include a cationic surfactant due to their detrimental impact on emulsion stability and reasons discussed elsewhere in the present disclosure. Accordingly, an amphoteric surfactant and/or non-ionic surfactants are preferred in lieu of cationic surfactants. Amphoteric surfactants and/or non-ionic surfactants boost the break/cure time of the emulsion when sprayed on the pavement. An amphoteric surfactant is one that can be cationic at low pH and also anionic at high pH while non-inonics do not carry specific charges. In contrast, a typical cationic surfactant, such as a fatty alkylamine, is always cationic. Cationic surfactants have a strong positive charge except at very high pH. However, a strong positive charge surfactant with gilsonite-asphalt blend as described herein is problematic and counter-productive. For instance, a strong positive charged surfactant destabilizes the emulsion over a short time period, especially at gilsonite loadings of more than 8%-10% by weight of the asphalt blend. With gilsonite present at 20% by weight of the asphalt blend, an amphoteric surfactant provides a gentle buffered-charge surfactant activity, which yields added stability. Furthermore, when the emulsion is sprayed on the pavement, an amphoteric surfactant accelerates the break/cure of the emulsion. In contrast, a non-ionic surfactant may indeed provide stability but also retards the break/cure of the emulsion when applied on the pavement. The present emulsion surprisingly balances these competing features while avoiding use of a cationic surfactant.

Exemplary amphoteric surfactants include, but are not limited to, alkoxylated alkylamine. Other exemplary amphoteric surfactants include betaines and amphoteric imidazolinium derivatives.

Exemplary non-ionic surfactants include ethoxylated compounds and esters, for example ethoxylated fatty alcohols, ethoxylated fatty acids, sorbitan esters, ethoxylated sorbitan esters, ethoxylated alkylphenols, ethoxylated fatty amides, glycerine fatty acid esters, alcohols, alkyl phenols, and mixtures thereof. In one example, the non-ionic surfactants may be nonylphenol ethoxylate or ethoxylated alcohol.

The surfactants comprise between about 0.25% to about 4.0% by weight of the emulsion. In one example, the surfactants comprise between about 0.25% to about 2.5% by weight of the emulsion. Furthermore, the amphoteric surfactants comprise between about 0.25% to about 1.0% by weight of the emulsion. The non-ionic surfactants may comprise between about 0.25% to about 4.0% by weight of the emulsion. In one example, the non-ionic surfactants comprise between 0.5% to about 2.0% by weight of the emulsion. However, the surfactant levels are not strictly limited to the stated ranges above.

The emulsion may include modifier to charge the gilsonite in the asphalt blend. The modifier is present between 0.25% to 3.0% by weight of the emulsion. At this level, the pH of the emulsion is reduced to less than 6.5 and preferably less than 5.0. A sub 6.5 pH level in the emulsion is indicative of charged gilsonite with the blend. As explained above, the modifier is used to drive the pH of the emulsion down to an acidic state so that the nitrogen pyrrole within gilsonite is activated to become a N+ positively charged molecule. Accordingly, the emulsion includes modified gilsonite that includes surfactant-like portions, which, in turn, improve stability and adhesion in use. The modifier may be an acid, such as hydrochloric acid.

The emulsion may contain other optional additives to adjust the emulsion properties in relation to the planned use, application method, and storage conditions. These include, for example, mineral salts, thickening agents, stabilizing agents, anti-freeze agents, adhesion promoters, biocides, pigments and the like. However, the emulsion is substantially free of tall oil pitch or coal tar.

In one example, the emulsion comprises, asphalt blend including gilsonite at level between about 55%-70%; one or more polymers at level between about 1%-5%; a nonionic surfactant at level between about 0.5%-2%; an amphoteric surfactant at a level between about 0.25%-1.0%; a modifier, such as acid, at a level between about 0.5%-2.5%; and water comprising the balance to 100% by weight of the emulsion.

The coating system also includes a fine aggregate material. The fine aggregate material may include, but is not limited to, crushed cherts, quartzites, or carbonites. Other types of fine aggregate materials may be used as well. The fine-aggregate may be dry, clean, sound, durable, and angular shaped, with highly textured surfaces. In one example, the fine aggregate can comprise at least 50% of silicon dioxide by weight of the fine aggregate and up to about 5% of calcium oxide by weight of the fine aggregate.

The fine aggregate material is effective for improving surface friction characteristics. The fine aggregate material may be easily and evenly applied with the emulsion onto the pavement at more substantial rates, e.g. at least 1.0 lb. per square yard. It is believed that upon application a significant proportion of the fine aggregate material embeds in, and is sufficiently bound, within the emulsion as the emulsion sets and cures. The fine aggregate material remains embedded sufficiently in order to provide enhanced friction and safety characteristics in the near-term as well as the long-term. The fine aggregate can have gradation limits shown in table 2 when tested in accordance with ASTM C136. Furthermore, an exemplary fine aggregate material may include properties illustrated in table 3 further below.

TABLE 2

Fine Material Aggregate Particle Size

| Sieve Designation | Percentage by Weight Passing Sieves |
|---|---|
| 12 | 100 |
| 14 | 98-100 |
| 16 | 85-98 |
| 30 | 15-45 |
| 50 | 0-8 |

TABLE 2-continued

Fine Material Aggregate Particle Size

| Sieve Designation | Percentage by Weight Passing Sieves |
|---|---|
| 70 | 0-2 |
| 200 | 0-1 |

TABLE 3

Fine Aggregate Properties

| Test | Test Method | Range |
|---|---|---|
| Micro-Deval | ASTM D7428 | Up to 15% |
| Magnesium Sulfate Soundness | ASTM C88-Fine Aggregate | Up to 2% |
| LA Abrasion | ASTIM C131-Grading D | Up to 8% |
| Fine Aggregate Angularity | ASTM C1252-Test Method A | At least 45% |
| Moisture Content (%) | ASTM C566 | Up to 2% |
| Bulk Dry Specific Gravity | ASTM C128 | 2.6-3.0 |
| Bulk SSD Specific Gravity | ASTM C128 | 2.6-3.0 |
| Apparent Specific Gravity | ASTM C128 | 2.6-3.2 |
| Absorption (%) | ASTM D2216 | Up to 3% |
| Mohs Hardness | Mohs Scale | At least 7.0 |
| AIMS texture | AIMS Texture Index | At least 90% |
| Polished Stone Value | ASTM 3319 | At least 65 |

In table 3, the Mohs hardness test is conducted according to standard test ASTM MNL46 using the Mohs scale. AIMS texture was tested according to AASHTO TP81, the source aggregate was tested using No. 4 to ¼" size particles. Polished stone value was tested according to ASTM 3319, modified for fine aggregate using a source aggregate passing through a ½" sieve and retained on ¼" sieve. The polished stone values are read using the "F" scale per the test method. Preferably the fine aggregate material has sustainably 100% fractured faces measured according to ASTM D-5821 The fine aggregate material may also have a sand equivalent greater than 85 tested according to ASTM D-2419.

The emulsion, without the addition of polymers, was also evaluated to determine various parameters. The emulsion without the addition of polymers herein may have properties as indicated in table 4 below.

TABLE 4

Properties of Stable Cationic Emulsion Without Polymer(s)

| Property | Text Method | Value |
|---|---|---|
| Saybolt Furol Viscosity at 77° F. (25° C.) | ASTM D244 | 20-100 seconds |
| Residue by Distillation or Evaporation | ASTM D244 | At least 55% (57%) |
| Sieve Test | ASTM D244 | Up to 0.1% |
| 24-hour Stability | ASTM D244 | Up to 1% |
| 5-day Settlement Test | ASTM D244 | Up to 5.0% |
| Particle Charge | ASTM D244 | Positive |
| pH | | 6.5 maximum pH |
| Viscosity at 275° F. (135° C.) | ASTM D4402 | 1750 cts maximum |
| Solubility in 1, 1, 1 trichloroethylene | ASTM D2042 | 97.5% minimum |
| Penetration | ASTM D5 | 50 dmm maximum |
| Asphaltenes | ASTM D2007 | 15% minimum |
| Saturates | ASTM D2007 | 15% maximum |

TABLE 4-continued

Properties of Stable Cationic Emulsion Without Polymer(s)

| Property | Text Method | Value |
| --- | --- | --- |
| Polar Compounds | ASTM D2007 | 25% minimum |
| Aromatics | ASTM D2007 | 15% minimum |

The complete emulsion, with polymers included, as described herein may have properties as indicated in table 5 below.

TABLE 5

Properties of Stable Cationic Emulsion With Polymer(s)

| Property | Test Method | Value |
| --- | --- | --- |
| Viscosity at 60° C. | AASHTO T-315 | up to 5000 cts |
| Softening Point ° C. | AASHTO T-53 | At least 60 |
| Penetration | AASHTO T-49 | 14-40 |
| Elastic Recovery 25° C. | AASHTO T-301 | 15%-75% |
| Ductility 25° C. | AASHTO T-51 | 5%-50% |

Embodiments of the present disclosure include a method of making the stable cationic emulsion described above. Initially, the method includes blending asphalt cement with gilsonite to form the asphalt blend with component ranges as described above. The blending may performed using a standard vat mixer or the like. This blending step may include adding an optional gas oil, e.g. an atmospheric light oil, to the asphalt blend. The gas oil may assist the penetration of the emulsion into the underlying pavement. Next, an optional surfactant is added to the asphalt blend. This optional surfactant is used to assist melting and blending of gilsonite in the asphalt blend. The asphalt blend composition at this stage is exposed to temperature of at least 300 degrees Fahrenheit for a period of time. In one example, the asphalt blend is exposed to a temperature of about 350 degrees Fahrenheit and mixed, at the elevated temperature, for 24-48 hours.

The method includes, separately from forming asphalt blend, preparing an aqueous solution comprising water, the modifier (e.g. acid), and one or more surfactant. As noted above, a cationic surfactant is not required in the aqueous solution. In one example, the acid is added to the water followed by the surfactant(s). This aqueous solution is then mixed for a period of time.

The asphalt blend and aqueous solution are then pumped into an emulsion mill to form an emulsion. More specifically, the method includes combining the asphalt blend with the aqueous solution to form a cationic stable emulsion. As described above, the acid creates a more acidic composition and has the effect of creating a positive charge on portions of the gilsonite in the asphalt blend, thereby forming the cationic emulsion with improved stability. The emulsion mill shears together the gilsonite-asphalt blend and the aqueous solution in a continuous process.

The method includes adding one or more polymers to the aqueous solution or to the emulsion. For example, the polymer(s) may be added to the aqueous solution, i.e. the water phase of the emulsion prior to milling. Alternatively, the polymer(s) may be "post added" to the milled emulsion prior to loading into storage tanks or transport vehicles The finished cationic emulsion may be pumped to the storage tanks and stored until needed. Because the cationic emulsion is stable, longer storage times are possible. This improves inventory control and allows the compounder to be more reactive to demand. Furthermore, the ability for increased storage times does not adversely affect the set and cure properties of the cationic emulsion when applied the pavement surface.

Figure 1A:
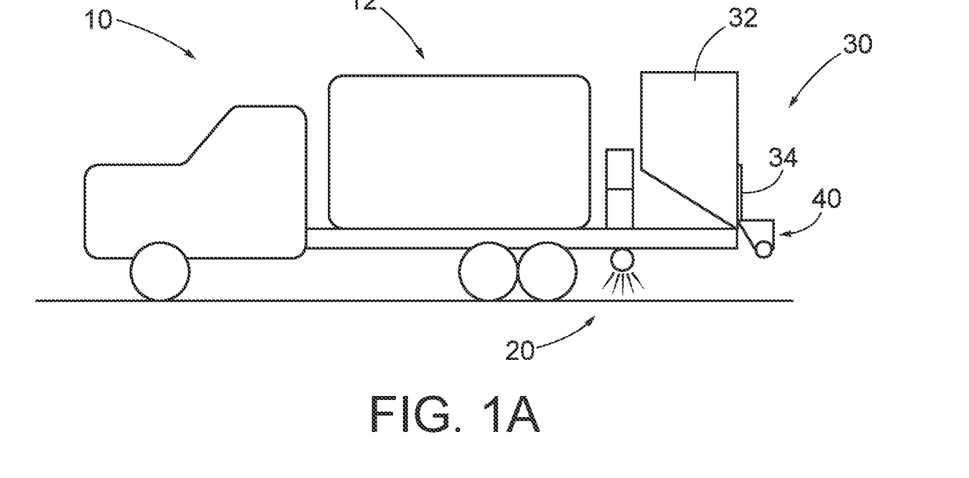
FIG. 1A is schematic of an applicator vehicle and a spreader unit used to apply the fine aggregate material to the surface in accordance with an embodiment of the present disclosure.
Figure 1B:
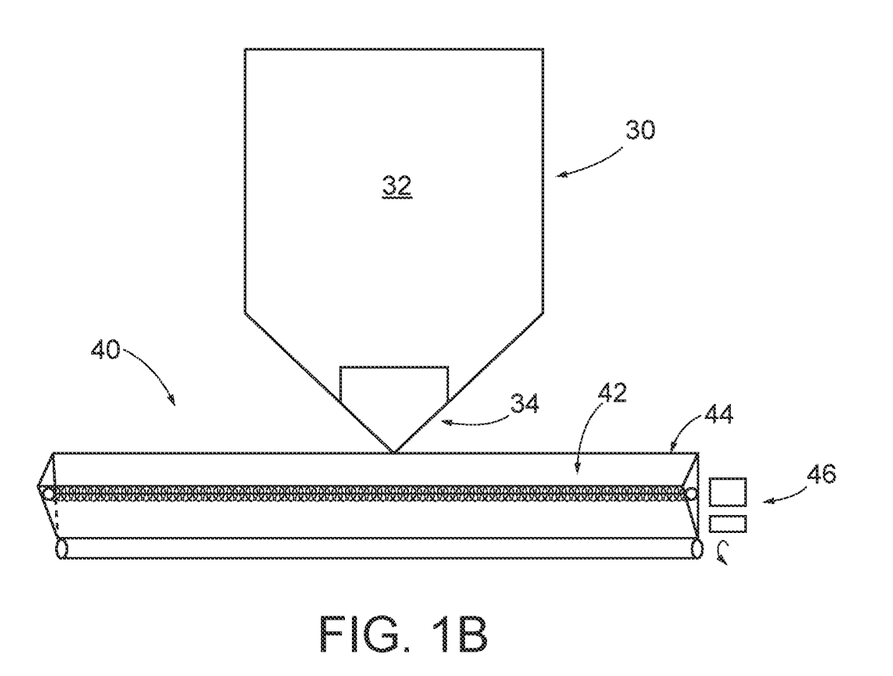
FIG. 1B is schematic of a spreader unit shown in FIG. 1A.
Figure 1C:
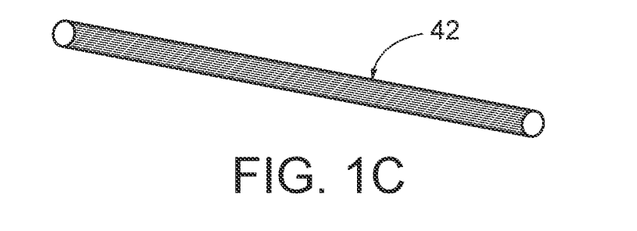
FIG. 1C is a perspective view of a portion of a roller assembly in the spreader unit shown in FIG. 1B.
Figure 1D:
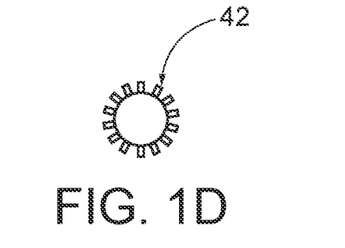
FIG. 1D is a side view of the portion of the roller assembly in the spreader unit shown in FIG. 1C.

Another embodiment of the present disclosure is a system and method for applying a coating system to a surface. The system and method can apply the coating system described above with an applicator vehicle 10 modified to accommodate high aggregate loading levels. FIGS. 1A-3 illustrate various embodiments of applicator vehicle used to application the coating system. As shown in FIG. 1A, the applicator vehicle 10 includes mounted thereon the spraying unit 20 and a spreader unit 30 so that the emulsion and the fine aggregate, respectively, can be co-applied with a single vehicle. The applicator vehicle 10 also includes a storage tank 12 that holds the cationic emulsion. The spraying unit 30 is configured to spray the stable cationic emulsion at various application rates as described herein. The spreader unit 30 is configured to apply the fine aggregate to the surface. In one embodiment, the spreader unit 30 includes a hopper 32 to hold the fine aggregate material and a controllable gate 34 coupled to the hopper 32. The controllable gate 34 is moveable to allow the fine-aggregate to exit the hopper 32. The spreader unit 30 also includes a roller assembly 40 near the controllable gate 34. The roller assembly 40 is configured to guide the fine aggregate material from the hopper 32 through the controllable gate 34 in order uniformly spread/drop the fine-aggregate onto the sprayed emulsion. The roller assembly 40 may include an elongate roller bar 42 (FIGS. 1B-1D) positioned inside a trough 44. As shown, the roller bar 42 may include outwardly extending tines that run the length of the roller bar 42. The roller bar 42 is operably coupled to a motor 46, which is used to rotate the roller bar 42. Thus, a preferred spreader unit may be referred to as roller unit or roller-spreader. The system optionally includes a means for assisting removal of the fine aggregate material from the hopper. Such an optional means may be an internal auger, a conveyor, or a vibrator or other similar device. The system also includes a controller configured to control operation of the spreader unit and the sprayer unit. The controller allows the operator of the applicator vehicle to control the fine-aggregate spreader unit in conjunction with the emulsion as those components are being applied to the surface.

Figure 2A:
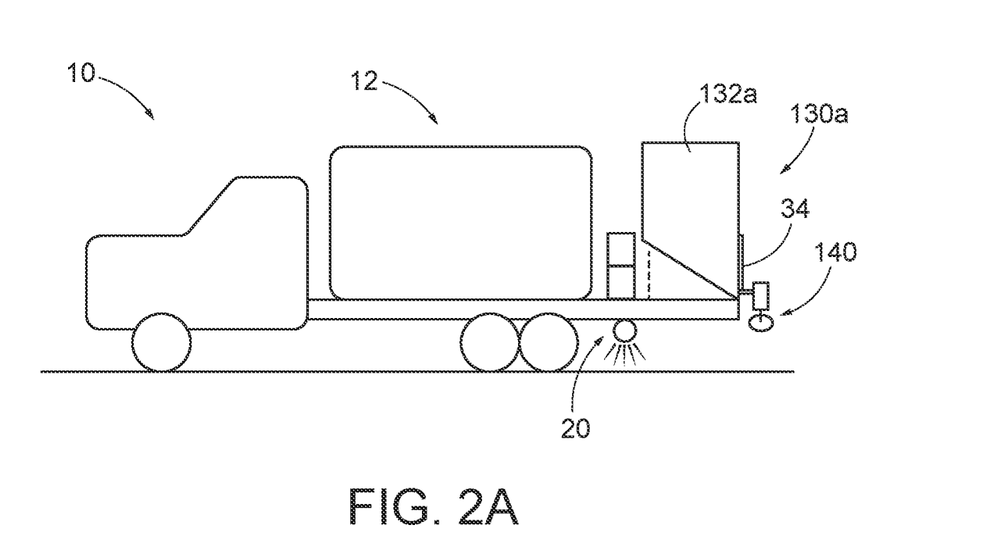
FIG. 2A is schematic of an applicator vehicle and a spreader unit used to apply the fine aggregate material to the surface in accordance with an embodiment of the present disclosure.
Figures 2B, 2C:
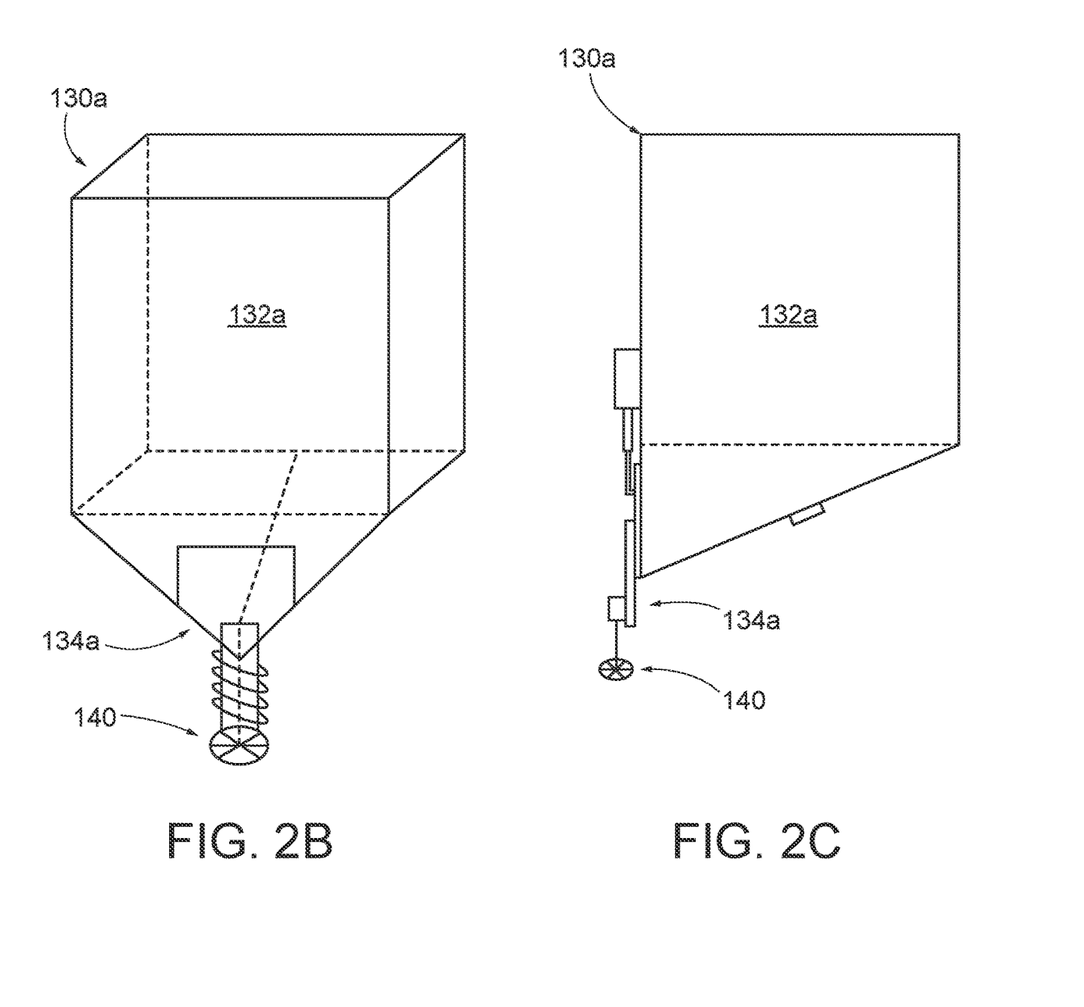
FIG. 2B is schematic rear view of a spreader unit shown in FIG. 2A.
FIG. 2C is schematic side view of the spreader unit shown in FIG. 2A.
Figure 2D:
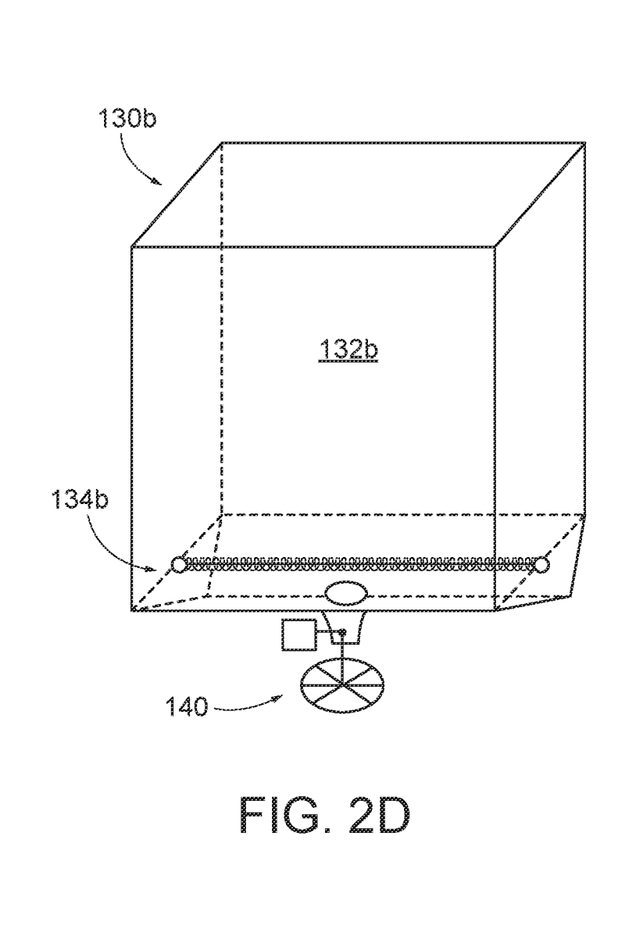
FIG. 2D is schematic rear view of a spreader unit according to another embodiment of the present disclosure.
Figure 2E:
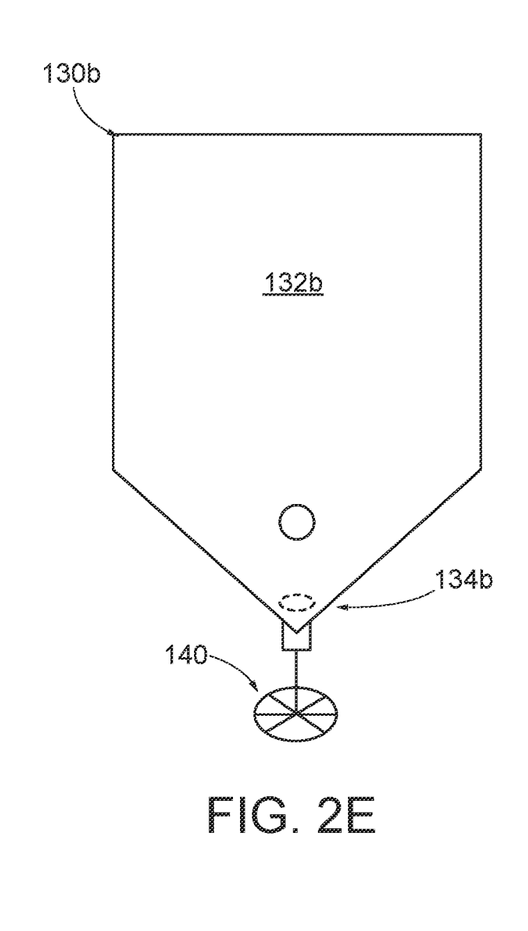
FIG. 2E is schematic side view of the spreader unit shown in FIG. 2D.
Figure 3:
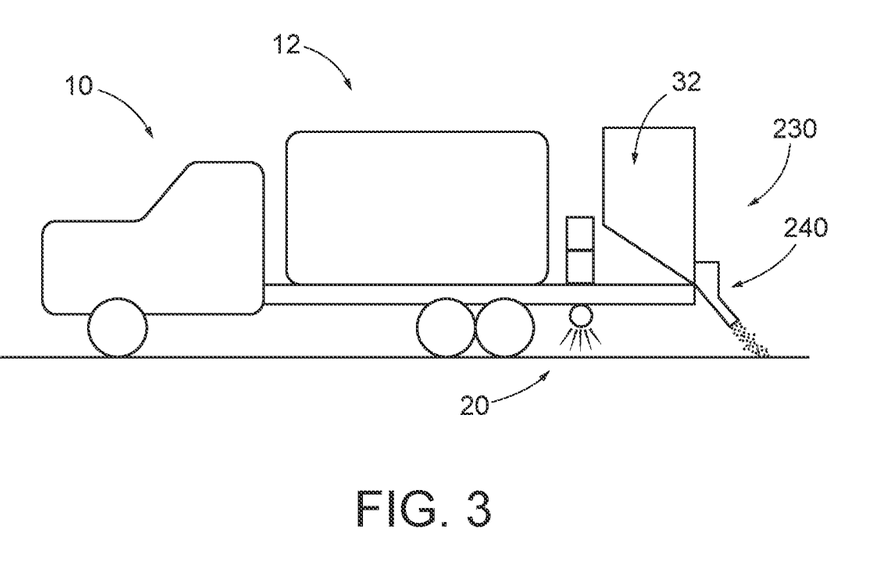
FIG. 3 is schematic of an applicator vehicle and a spreader unit used to apply the fine aggregate material to the surface in accordance with an embodiment of the present disclosure.

FIGS. 2A-3 illustrate alternative embodiments of an applicator vehicle. Common parts and features between the applicator vehicle 10 shown in FIGS. 1A-1D and the applicator vehicle illustrated in FIGS. 2A-3 have the same reference numbers. In accordance with one embodiment as shown in FIGS. 2A-2E, the applicator vehicle 10 includes a spinning spreader unit 130a with a hopper 132a (FIGS. 2B and 2C). Accordingly, in lieu of the roller assembly, the spreader unit may include a spinning plate 140 with fins (i.e. whirly spinner). Furthermore, a gate 134a may disposed toward the back of the hopper 132a. In accordance with one embodiment as shown in FIGS. 2D-2E, the applicator vehicle 10 includes a spinning spreader unit 130b with a hopper 132b. The spinning spreader unit 130b may include a spinning plate 140 with fins (i.e. whirly spinner). However, the gate 134 may disposed toward the back of the hopper 132a. Alternatively, as shown in FIGS. 2D and 2E, the gate 134b may be disposed below the hopper 132b. In accordance with the disclosed embodiments, improved friction results have been obtained with the standard "whirly spinner" units, albeit with some modifications.

In yet another embodiment illustrated in FIG. 3, the system may alternatively be used with applicator vehicle 10 adapted to include an air driven spreader unit 230 as shown in FIG. 3. Accordingly, in lieu of the roller assembly, the spreader unit may include an air unit 240 which is air-driven device to apply aggregate via air.

The method of applying the coating system includes spraying, with the applicator vehicle, a stable cationic emulsion on to a surface. As noted above, the stable cationic emulsion includes: a) an asphalt blend comprising gilsonite, wherein the gilsonite is modified to possess a positive charge; b) one or more polymers; and c) one or more surfactants not including a cationic surfactant. In one example, the stable cationic emulsion is sprayed onto to surface at an amount of 0.10 to 1.0 gallons per square yard. In another example, the stable cationic emulsion is sprayed at an amount of 0.15 to 0.25 gallons per square yard.

The method also includes applying a fine aggregate at a rate of at least 1.0 lbs per square yard onto the stable cationic emulsion applied to the surface. In one example, the fine aggregate material is applied onto the stable cationic emulsion in an amount of from 1.0 lb per square yard to 5.0 lbs per square yard. The stable cationic emulsion is sprayed via the sprayer unit mounted on the vehicle. And the fine aggregate is applied with spreader unit mounted on the same applicator vehicle. It should be appreciated, however, that it is possible to apply the stable cationic emulsion and the fine aggregate materials using more than one applicator vehicle.

The present disclosure may be further understood with reference to the following non-limiting examples.

Example 1

The cationic emulsion and fine aggregate material where prepared as described herein. The spreader unit (whirly spinner version) was mounted on a standard asphalt distributor spray truck. The truck was set to apply from 1.0 to 3.0 lbs/SY of the fine aggregate material. The cationic emulsion composition comprised about 60% by weight of the emulsion of the asphalt blend and about 2.5% by weight of the emulsion of a latex polymer (SB-acrylic). The fine aggregate material comprised physical properties as indicated in tables 2 and 3 above. In particular, the graded particle size was 100% passing a No. 14 US sieve. The cationic emulsion was applied to an airfield asphalt pavement surface which, prior to coating, was in "poor" condition according to the standard the Pavement Condition Index (PCI). The cationic emulsion was applied to surface at 0.20 gallons per square yard and the fine aggregate material was applied at 1.5 pounds per square yard. After application and drying, the surface friction test was conducted. In this instance, friction testing proceeded according to Federal Aviation Administration (FAA) test method for continuous friction measuring equipment (CFME), FAA AC 150/5320-12. The FAA's CMFE standard is used to evaluate the friction value of an airfield surface and thus its safety level. This test provides a direct measure of surface friction against a braking tire and sets minimum values a surface must have to be FAA compliant. The test revealed FAA CMFE 40 mph test value of 1.07 and 60 mph value of 1.05. The tests were made after 6 days, after 34 days, and after 160 days in order to gauge the consistency of the surface's friction over time and in presence of severe winter weather using snowplows. The measured values are recorded in table 6 below. The condition of the pavement, according the PCI, post application was observed as "significantly improved" to "good." Thus, significant recovery of the lost friction caused by the non-aggregate components of the cationic emulsion was achieved by adding 1.5 pounds per square yard of fine aggregate material. At this loading level, the coating system in example 1 exceeded the FAA requirements for safety.

TABLE 6

Record Values from Test Conducted in Example 1

|  | Control 40 mph | Control 60 mph | Test 40 mph | Test 60 mph |
| --- | --- | --- | --- | --- |
| 6 days | 1.07 | 1.05 | 0.89 | 0.91 |
| 34 days |  |  | 0.94 | 0.92 |
| 160 days |  |  | 1.01 | 0.89 |

Example 2

In this example, the cationic emulsion and fine aggregate material were prepared as in Example 1, with the exception being that for the emulsion the polymer was an acrylic at a 2.0% level (by weight of the emulsion). The coating system was applied to an airfield asphalt runway pavement surface which, prior to coating, was in "fair" condition. The coating system was applied to six test areas using the application rates as shown table 7 below.

TABLE 7

Test Plan for Example 2

| Test Area | Cationic Emulsion Application Rate (gal/yd$^2$) | Fine Aggregate Application Rate (lb./yd$^2$) |
| --- | --- | --- |
| 1 | 0.16 | 1.5 |
| 2 | 0.17 | 1.5 |
| 3 | 0.18 | 1.5 |
| 4 | 0.16 | 3.0 |
| 5 | 0.17 | 3.0 |
| 6 | 0.18 | 3.0 |

After application and drying, the friction was evaluated using the FAA AC CMFE procedure. The tests were made after 24 hours, and after 5 days, in order to gauge the consistency of the surface's friction over time. The measured values after application are shown in table 8 below. The tests were conducted according to FAA AC 150/5320-12.

TABLE 8

Friction Data for Example 2

| Test Area | 24 hrs- 40 mph | 24 hrs- 60 mph | 5 days- 40 mph | 5 days- 60 mph |
| --- | --- | --- | --- | --- |
| 1 | 0.67 | 0.65 | 0.95 | 0.74 |
| 2 | 0.68 | 0.60 | 0.91 | 0.81 |
| 3 | 0.70 | 0.70 | 0.9 | 0.73 |
| 4 | 0.81 | 0.75 | 1.05 | 0.94 |
| 5 | 0.80 | 0.71 | 0.92 | 0.93 |
| 6 | 0.78 | 0.75 | 1.05 | 0.94 |

As can be seen in FIG. 3 and table 8, a significant recovery of the lost friction caused by the non-aggregate components of the emulsion was achieved by adding 1.5 lb./yd$^2$ of aggregate at the three different cationic emulsion rates. In this example, the results exceeded the FAA requirements for safety, in addition to observing significant improvement in pavement condition using the PCI. In addition, at the rate of 3.0 lb./SY of aggregate, the coating system actually increased the overall friction of the pavement beyond the pre-treatment level and up into the highest level achievable. Data at this level is believed to correlate to that of a new pavement. This is a surprising result for such relatively low fine-aggregate levels.

The inventive concepts described herein have several benefits and surprising results. The inventive coating systems attain improved friction characteristics that have not been observed in typical pavement coating applications with light to medium (or higher) application levels. For example, there are limits in the current practice of seal-coating surfaces at these loading levels. For one, the application of a thicker coating systems on the pavement necessitates a) a concomitant increase in the amount of aggregate materials applied, and b) use of a larger particle. However, the typical aggregates approved for use (by various governmental agencies) are not suitable for such "thicker" applications. Furthermore, existing applicator vehicles are not designed to apply the aggregate uniformly at levels of 1.0 lbs per square yard or greater. In addition, regardless of the amount of aggregate applied to pavement, the higher rate of application of conventional asphalt emulsions can still result an unacceptable level of stickiness/tackiness. This, in turn, may result in the emulsion stick to tires and may possible peel off the pavement. The present inventive concepts overcome these drawbacks in a number of ways. The described asphalt-emulsion can be thicker, can adhere to the pavement better, can retain friction fine-aggregate better, and is more durable over time. The fine aggregate material can be applied to the emulsion on the pavement at increased rates. For instance, the fine aggregate material can be applied at least 1.0 lbs. per square yard, or higher.

On the pavement, the residue remaining from the broken and cured emulsion has a few special characteristics due to the gilsonite. The penetration into and softening of the aged oxidized underlying surface AC is enhanced by the gilsonite. Also, the gilsonite allows the addition of softer AC to the blend, which synergistically provides for restoration of the underlying aged pavement's AC while simultaneously not being overly soft on the surface so as to be impractical as a sealer. The gilsonite also is a natural antioxidant and is resistant to UV degradation.

The coating system yields a "typical" cure (e.g. 8-12 hours or more) with "decent" short-term friction results and excellent long-term friction results. In particular, the emulsion cures in a matter of 8-12 hours, or longer, depending on weather conditions, but the emulsion system appears to retain a high percentage of the friction fine-aggregate. The friction numbers for the emulsion system tend to continue to steadily increase over time, eventually achieving or even exceeding the pre-treatment friction numbers.

The inventive coating system delivers also all the benefits of fog seal but with an increase concomitant with the increase in applied residue on the pavement, e.g. from light up to medium application rates. The coating system is a long-term solution, believed to last 5 or more years. Furthermore, the coating system improves pavement condition by penetrating and fusing with the pavement. The coating system does this while also maintaining a relatively high amount of friction via high-performance CMFE test methods, not just initially but also long-term.

The coating system may be applied via in a convenient single-vehicle system. This limits contractor investment and labor costs and results in a system that can be applied more efficiently. Furthermore, the coating system is suitable for use on high-speed runways and all other airfield pavements (no limitations), or roadways.

Furthermore, the coating systems described herein are stable and balanced enough to be applied at substantially higher amounts and still provide for the airfield pavement safety characteristics as well as a longer improvement in condition. However, unlike other treatments, the coating system as described herein does not require an excessive blanket of aggregate spread over the binder. This removes the needed additional sweeping operations to remove loose aggregate and generally being a safety issue for airfields.

The coating system does not require a liquid mixture of binder and aggregate and other fillers, which will eventually crack, delaminate and deteriorate, creating safety issues. The described coating system can be applied in a suitably thick layer such that it provides a more durable yet still safe surface coating with excellent friction characteristics throughout the extended life of the coating system.

The inventive coating system, and the emulsion in particular, can be easily stored, shipped, and applied to the desired surface. Likewise, the inventive aggregate composition includes a fine, dense, angular high-friction aggregate material that is suitable for co-application with the emulsion via a convenient vehicle-mounted spreader unit. Together these components are surprisingly effective for maintaining, or even increasing the surface micro-texture and macro-texture roughness of the coating components while also providing increased durability.

It will be appreciated by those skilled in the art that various modifications and alterations of the present disclosure can be made without departing from the broad scope of the appended claims. Some of these have been discussed above and others will be apparent to those skilled in the art. The scope of the present disclosure is limited only by the claims.

The invention claimed is:

1. A method of manufacturing a stable cationic asphalt emulsion, comprising:
   blending an asphalt cement with gilsonite to form an asphalt blend;
   preparing an aqueous solution comprising water, a modifier, and one or more surfactants, wherein none of the one or more surfactants is a cationic surfactant;
   combining the asphalt blend with the aqueous solution to form a stable cationic emulsion, wherein a positive charge is imparted on at least a portion of the gilsonite; and
   adding one or more polymers to either the aqueous solution or the stable cationic emulsion.

2. The method of claim 1, wherein the adding the one or polymers occurs after combining the asphalt blend with the aqueous solution.

3. The method of claim 1, wherein the asphalt blend comprises between about 50.0% to about 70.0% by weight of the emulsion.

4. The method of claim 3, wherein the gilsonite is present at level of at least about 20% by weight of the asphalt blend.

5. The method of claim 1, wherein the one or more polymers is an acrylic, a styrene-butadiene rubber, or a combination thereof.

6. The method of claim 1, wherein the one or more polymers comprise between about 1.0% to about 5.0% by weight of the emulsion.

7. The method of claim 1, wherein the one or more surfactants comprise between about 0.25% to about 4.0% by weight of the emulsion.

8. A method for applying a coating system to a surface, comprising:

spraying a stable cationic emulsion onto a surface, the stable cationic emulsion having:
  a) an asphalt blend comprising gilsonite, wherein at least a portion of the gilsonite is modified to possess a positive charge;
  b) one or more polymers, and
  c) one or more surfactants, wherein none of the one or more surfactants is a cationic surfactant; and
applying an aggregate at a rate of at least 1.0 lbs per square yard onto the stable cationic emulsion applied to the surface.

9. The method of claim 8, wherein the stable cationic emulsion is sprayed onto to surface at an amount of 0.10 to 1.0 gallons per square yard.

10. The method of claim 9, wherein the stable cationic emulsion is sprayed at an amount of 0.15 to 0.25 gallons per square yard.

11. The method of claim 8, wherein the aggregate is applied onto the stable cationic emulsion in an amount of from 1.0 lb per square yard to 5.0 lbs per square yard.

12. The method of claim 8, wherein applying the aggregate and spraying the stable cationic emulsion are performed with the same applicator vehicle.

13. The method of claim 1, wherein adding the one or polymers occurs before combining the asphalt blend with the aqueous solution.

14. The method of claim 1, wherein the stable cationic emulsion has a pH of about 5.0 or less.

15. The method of claim 8, wherein the stable cationic emulsion has a pH of about 5.0 or less.

* * * * *